(12) United States Patent
Sakurai

(10) Patent No.: US 7,715,702 B2
(45) Date of Patent: May 11, 2010

(54) LENS ADAPTER AND IMAGING APPARATUS

(75) Inventor: Nobumasa Sakurai, Saitama (JP)

(73) Assignee: Sony Corporation, Tokyo (JP)

( * ) Notice: Subject to any disclaimer, the term of this patent is extended or adjusted under 35 U.S.C. 154(b) by 250 days.

(21) Appl. No.: 12/032,821

(22) Filed: Feb. 18, 2008

(65) Prior Publication Data

US 2008/0205881 A1 Aug. 28, 2008

(30) Foreign Application Priority Data

Feb. 26, 2007 (JP) .......................... P2007-046087

(51) Int. Cl.
  *G03B 17/00* (2006.01)
(52) U.S. Cl. .................. 396/71; 396/529; 396/530; 359/503; 359/703; 359/706
(58) Field of Classification Search ............... 396/6, 396/71, 529, 530; 359/503, 506, 702–706
  See application file for complete search history.

(56) References Cited

U.S. PATENT DOCUMENTS

RE33,783 E * 12/1991 Spehrley et al. ............. 358/494
5,311,358 A * 5/1994 Pederson et al. ............ 359/510
7,006,301 B2 * 2/2006 Tsuchiya et al. ............ 359/694

FOREIGN PATENT DOCUMENTS

| JP | 06-029276 | 4/1994 |
| JP | 2000-235222 | 8/2000 |
| JP | 2004-020770 | 1/2004 |

* cited by examiner

*Primary Examiner*—W. B. Perkey
*Assistant Examiner*—Warren K Fenwick
(74) *Attorney, Agent, or Firm*—K&L Gates LLP

(57) ABSTRACT

A lens adapter is disclosed. The lens adapter includes: an adapter ring having a flexible fitting portion and an installation portion in which an optical component is mounted, the fitting portions being fitted over a fitting engagement portion of a lens ring mounted around a lens portion facing a front surface of an imaging apparatus; and a lock ring fitted over an outer surface of the adapter ring, the lock ring being manipulated so as to be moved between a locked position where the lock ring is opposite to the fitting portions fitted over the fitting engagement portion and flexure of the fitting portions is prevented and an unlocked position where the lock ring is retracted from the locked position.

14 Claims, 15 Drawing Sheets

LENS ADAPTER AND IMAGING APPARATUS

CROSS REFERENCES TO RELATED APPLICATIONS

The present application claims priority to Japanese Patent Application JP 2007-046087 filed in the Japanese Patent Office on Feb. 26, 2007, the entire contents of which being incorporated herein by reference.

BACKGROUND

The present application relates to an imaging apparatus and, more particularly, to a lens adapter in which an optical component such as a conversion lens is mounted and also to an imaging apparatus using the lens adapter.

From the past, digital still cameras have often incorporated retractable zoom lenses. In this kind of digital still camera, a zoom optical system is housed in a camera body. Thus, the zooming function is accomplished without spoiling the thinness of the camera. Normally, when the power supply for the camera body is turned on, the zoom lens projects forwardly. When the power supply is turned off, the lens is retracted into the camera body.

However, only with the zoom lens incorporated in the camera body that has been thinned, the magnification is restricted. Therefore, in order to obtain images at high magnifications, it is necessary to install a separate tele-conversion lens or other optical component onto the lens barrel. A digital still camera having such an optical component that can be mounted onto the lens barrel is described, for example, in patent reference 1 (JP-A-2000-235222). In the digital still camera described in this patent reference 1, a cylindrical lens accommodation portion in which a zoom lens unit is housed protrudes from the front surface of the camera body. A threaded groove is formed in the inner wall of the lens accommodation portion. Furthermore, a threaded groove is formed at one end of the tele-conversion lens. The optical component is mounted without applying a load to the zoom optical system by screwing the tele-conversion lens into the threaded groove in the lens accommodation portion. When the tele-conversion lens is not in use, it is removed from the lens accommodation portion.

However, in the digital still camera in which an optical component such as a tele-conversion lens is screwed into the lens accommodation portion formed in the camera body, it is necessary to secure a region where plural turns of threaded grooves are formed. Therefore, it may be required that the lens accommodation portion protrude ahead of the camera body. The lens accommodation portion protrudes from the camera body at all times, i.e., even when no tele-conversion lens is mounted. In the camera body that has been thinned, forward protrusion of the lens accommodation portion impairs portability and design.

On the other hand, if the number of threaded grooves formed in the lens accommodation portion is made fewer, and if the amount of protrusion of the lens accommodation portion is reduced, the thinness of the camera body is not deteriorated but there is the possibility that the reliability with which a connection is made with the tele-conversion lens is deteriorated.

SUMMARY

Accordingly, it is desirable to provide a lens adapter in which an optical component such as a tele-conversion lens can be mounted reliably while maintaining the thinness of the camera body. It is also desirable to provide an imaging apparatus using this lens adapter.

A lens adapter according to an embodiment has an adapter ring and a lock ring fitted over the outer surface of the adapter ring. The adapter ring has a flexible fitting portion and an installation portion in Which an optical component is mounted. The fitting portions are fitted over a fitting engagement portion of a lens ring mounted around a lens portion facing the front surface of an imaging apparatus. The lock ring is manipulated so as to be moved between a locked position and an unlocked position. At the locked position, the lock ring is opposite to the fitting portions fitted over the fitting engagement portion and flexure of the fitting portions is prevented. At the unlocked position, the lock ring is retracted from the locked position.

An imaging apparatus according to another embodiment is for use with a lens adapter having: a lens portion having a taking lens facing outward from the front surface of the body of the apparatus; an adapter ring having fitting portions and an installation portion in which an optical component is mounted; and a lock ring fitted over the outer surface of the adapter ring and manipulated so as to be moved between a locked position and an unlocked position. At the locked position, the lock ring is opposite to the fitting portions fitted over the fitting engagement portion and flexure of the fitting portions is prevented. At the unlocked position, the lock ring is retracted from the locked position. The imaging apparatus has a fitting engagement portion and a lens ring mounted around the lens portion. The fitting engagement portion is brought into fitting engagement with the fitting portions.

According to an embodiment, the adapter ring is mounted to the lens ring that is on the imaging apparatus side by bringing the fitting portions into engagement with the fitting engagement portion. The lock ring can prevent disengagement of the fitting portions from the fitting engagement portion. Therefore, the height of the lens ring can be lowered. The thinness of the body of the imaging apparatus can be maintained. Furthermore, the optical component can be mounted reliably.

Additional features and advantages are described herein, and will be apparent from the following Detailed Description and the figures.

DETAILED DESCRIPTION

Figure 1:
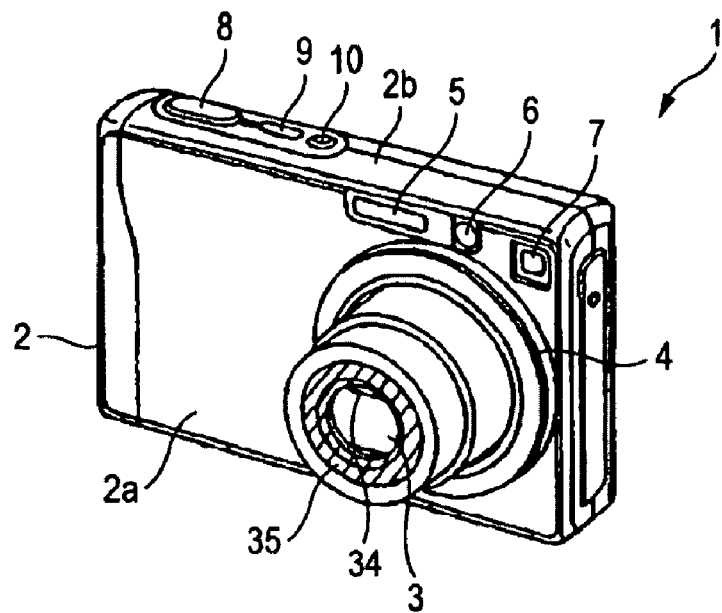
FIG. 1 is a perspective view of the front side of an imaging apparatus according to an embodiment.

A lens adapter and an imaging apparatus described in further detail below with reference to the drawings. An imaging apparatus according to an embodiment is a thinned digital still camera 1 as shown in FIG. 1. The camera 1 has a camera body 2 forming the enclosure of the camera. A lens portion 3 and a lens ring 4 are formed over the front surface 2a of the camera body 2. The lens portion 3 has a zoom optical system. The lens ring 4 over which a lens adapter 40 is fitted is mounted around the lens portion 3.

Figure 2:
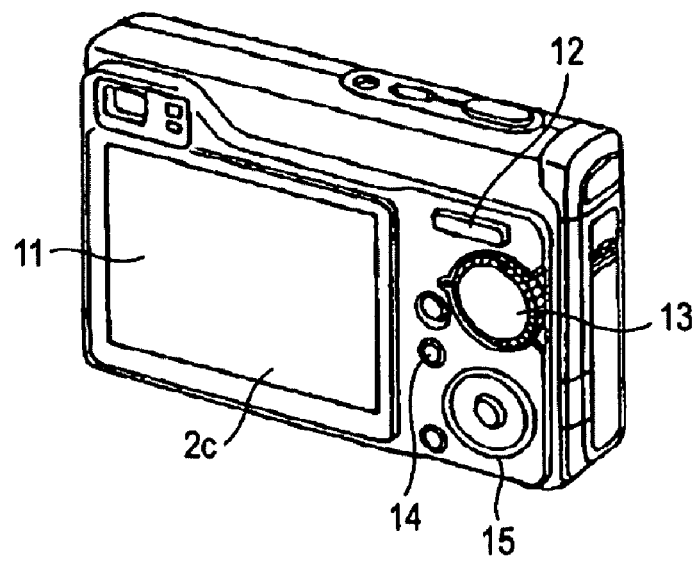
FIG. 2 is a perspective view of the rear side of the imaging apparatus according to an embodiment.

Mounted on the front surface 2a of the camera body 2 are a flash 5 emitting photographic fill light, a self-timer lamp 6, and a viewfinder window 7. Mounted on the upper surface 2b of the camera body 2 are a shutter button 8 for performing imaging, a power switch 9 for turning on and off the power supply for the camera body 2, and a microphone 10. Furthermore, as shown in FIG. 2, a display unit 11 for displaying the captured image is mounted on the rear surface 2c of the camera body 2. Various switches including a zoom control switch 12 for controlling the zoom optical system formed in the lens portion 3, a mode selector switch 13 for switching the mode of operation among still image photography mode, motion picture photography mode, and playback mode, a menu switch 14 for displaying a menu on the display unit 11, and a control switch 15 for performing manipulations for selecting items of the menu displayed on the display unit 11 are mounted on a side of the display unit 11.

Figure 3:
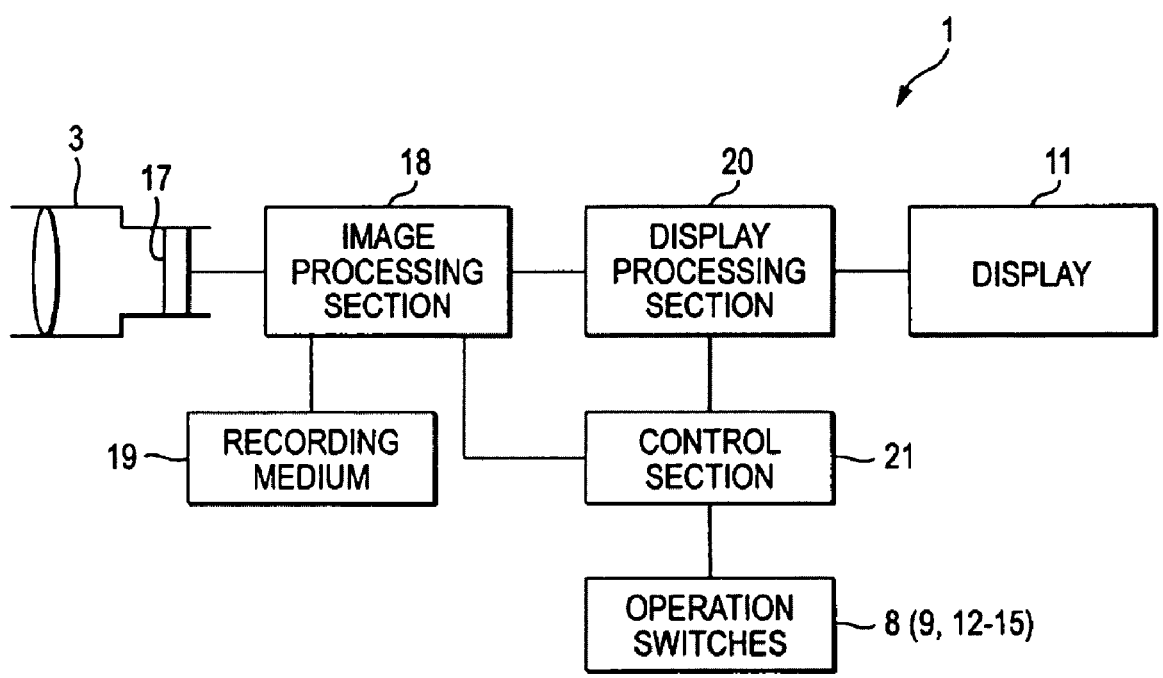
FIG. 3 is a functional block diagram of the imaging apparatus according to an embodiment.

As shown in FIG. 3, the lens portion 3 has an imaging device 17 as made of a CCD sensor or CMOS sensor. The lens portion 3 forms the zoom optical system for guiding a subject image accepted from the taking lens into the imaging device 17. Furthermore, the lens portion 3 forms a focus optical system.

In this digital still camera 1, an image captured by the imaging device 17 is output as an imaging signal to an image-processing portion 18. In the image-processing portion 18, the imaging signal is processed to thereby create image data about still images or a motion picture sequence. The created image data is recorded in a storage medium 19 such as a memory card. The image data is displayed on the display unit 11 by a display-processing portion 20.

Furthermore, the digital still camera 1 includes a control portion 21 which includes a CPU for controlling the image-processing portion 18, display-processing portion 20, and other portions according to manipulations of various button and control switches including shutter button 8, power switch 9, zoom control switch 12, mode selector switch 13, menu switch 14, and control switch 15.

Figure 4:
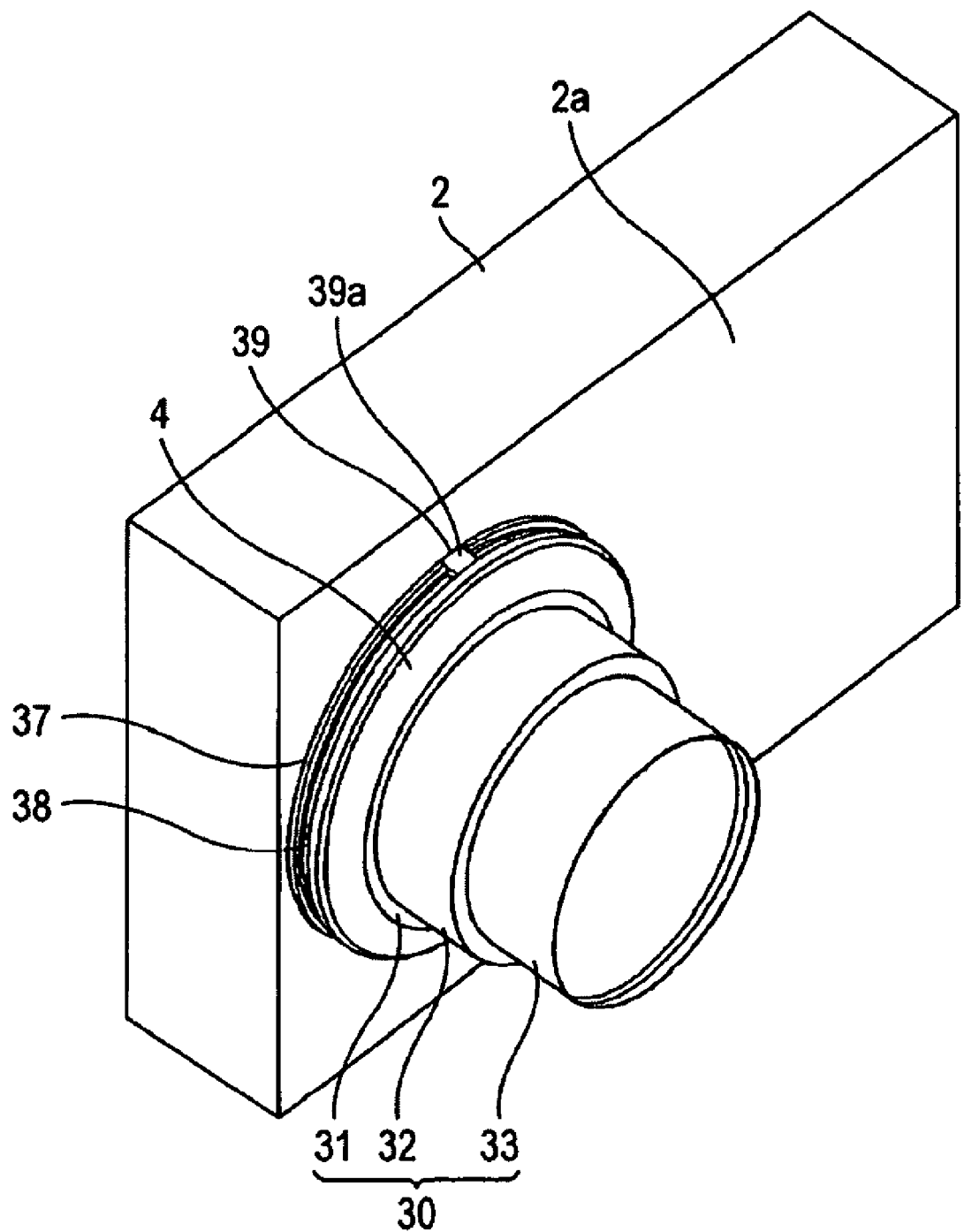
FIG. 4 is a perspective view of a lens ring.

The lens portion 3 and lens ring 4 mounted on the front surface 2a of the digital still camera 1 are next described. The lens portion 3 incorporates a retractable zoom lens. When the power supply is turned off, a lens barrel 30 is received into the camera body 2. When the power supply is turned on, the lens barrel 30 is made to protrude ahead of the front surface 2a side of the camera body 2. The lens barrel 30 has a fixed barrel portion 31 whose one end faces outward from the front surface 2a of the camera body 2, an outer movable barrel portion 32 disposed inside the fixed barrel portion 31, and an inner movable barrel portion 33 disposed inside the outer movable barrel portion 32. As shown in FIG. 4, when the power supply for the camera body 2 is turned on, the outer movable barrel portion 32 of the lens barrel 30 is made to protrude ahead of the fixed barrel portion 31, and the inner movable barrel portion 33 protrudes ahead of the outer movable barrel portion 32.

The fixed barrel portion 31 is disposed inside the camera body 2 and has one end protruding from the front surface 2a of the camera body 2. The height of the protrusion is substantially identical with the height of the protrusion of the lens ring 4. A lens frame is disposed in the fixed barrel portion 31 and supports fixed lenses. The outer movable barrel portion 32 has a diameter substantially identical with the inside diameter of the fixed barrel portion 31 and is supported so as to be capable of being moved back to and forth from the fixed barrel portion 31. The lens frame is mounted to the outer movable barrel portion 32, which supports zoom lenses.

The inner movable barrel portion 33 has a diameter substantially identical with the inside diameter of the outer movable barrel portion 32, and is supported so as to be capable of being moved back to and forth from the outer movable barrel portion 32. The lens frame is mounted to the inner movable barrel portion 33, which supports the zoom lenses. A lens cover 34 is disposed at the front end of the inner movable barrel portion 33 such that the cover can be opened and closed. When the power supply for the camera body 2 is turned on and the lens barrel 30 is made to protrude, the lens cover 34 is opened. When the power supply for the camera body 2 is turned off and the lens barrel 30 is retracted into the camera body 2, the lens cover 34 is closed. Under this condition, the taking lens is protected.

An antireflective portion 35 is formed on the front surface 33a of the inner movable barrel portion 33 to prevent reflection within lens adapters 40 and 60 (described later) when these lens adapters 40 and 60 are mounted. The antireflective portion 35 is made of a black coated region for preventing reflection of light. The coated region is formed over the outer periphery of a lens window 36 of the inner movable barrel portion 33. The antireflective portion 35 is located opposite to fixed apertures 48 and 71 formed in the lens adapters 40 and 60 (described later), and has an area equal to or greater than the areas of the fixed apertures. Accordingly, the digital still camera 1 can suppress generation of ghost and flare by preventing reflection of incident light within the lens adapters 40 and 60.

When the lens portion 3 is received in the camera body 2, the outer movable barrel portion 32 and inner movable barrel portion 33 become flush with the fixed barrel portion 31 or are slightly retracted toward the front surface 2a, thus improving the portability when the camera is not in use and preventing damage to the lens portion 3.

The lens ring 4 formed around the lens portion 3 is an annular member formed over the front surface 2a of the camera body 2 as shown in FIG. 4. The inside diameter of the ring 4 is substantially identical with the outside diameter of the fixed barrel portion 31. The ring 4 is so disposed that almost no gap is formed between the ring 4 and the lens portion 3. The height of the lens ring 4 from the front surface 2a of the camera body 2 is substantially identical with the height of the fixed barrel portion 31. Thus, the lens portion 3 is protected.

The lens ring 4 has a fitting engagement portion 37 formed circumferentially along the outer periphery. The fitting engagement portion 37 is made of a concave groove 38 formed in the outer surface of the lens ring 4. The lens adapter 40 (described later) fits into the concave groove 38. In this way, the lens ring 4 makes intimate engagement with the lens adapter 40 via the fitting engagement portion 37 made of the concave groove 38. Therefore, the height may be only required that only the concave groove 38 can be formed. The height of the protrusion from the front surface 2a can be suppressed compared with the structure in which a lens ring makes intimate engagement with a lens adapter via plural turns of threaded grooves and that the threaded grooves protrude in the direction of height.

Figure 5:
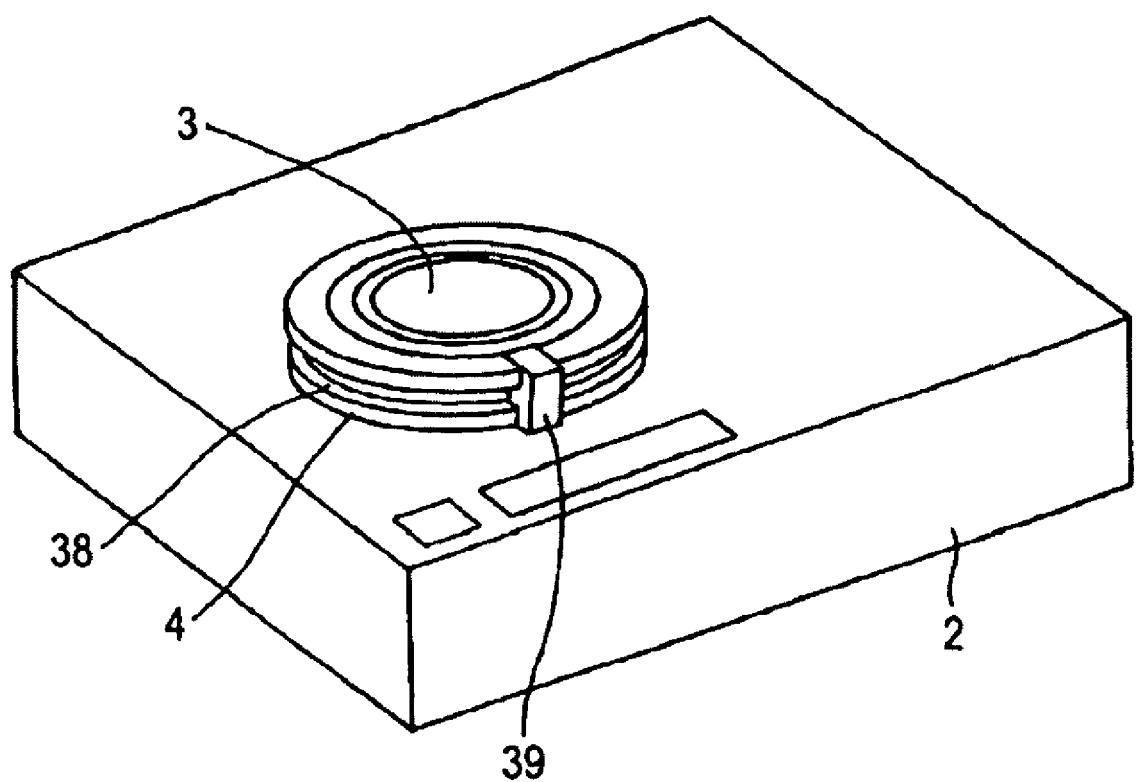
FIG. 5 is a perspective view of another lens ring.

A limiting wall 39 is formed in the concave groove 38 to limit rotation of the adapter ring 41 of the lens adapter 40. The limiting wall 39 has limiting blocks 39a disposed in the concave groove 38. The adapter ring 41 has fitting convex portions 51 abutting against the limiting blocks 39a. The limiting wall 39 is mounted at arbitrary one or more locations in the concave groove 38. The limiting blocks 39a are disposed at a height at which they do not protrude from the concave groove 38. However, as shown in FIG. 5, the limiting blocks 39a may protrude from the concave groove 38.

Figure 6:
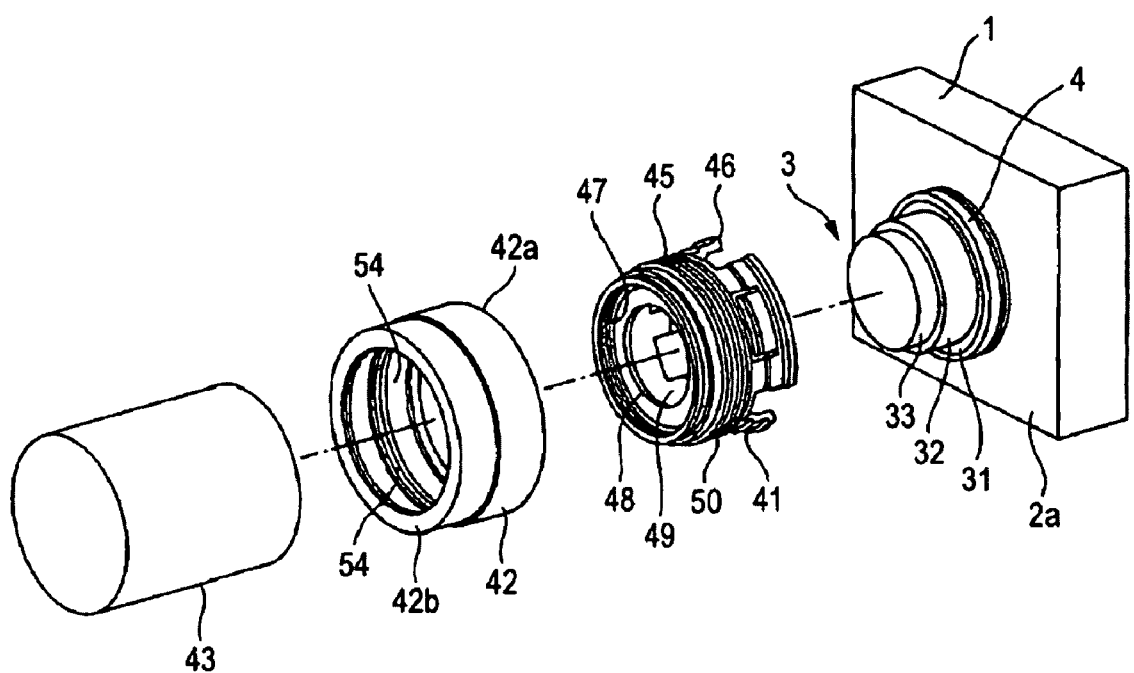
FIG. 6 is a perspective view of an imaging apparatus and a lens adapter according to another embodiment.

The lens adapter 40 fitted over the lens ring 4 is next described. The lens adapter 40 acts as an adapter when an optical component 43 such as a tele-conversion lens is mounted to the camera body 2. As shown in FIG. 6, the adapter 40 has the adapter ring 41 and a lock ring 42 for attaching and detaching the ring 41 to and from the lens ring 4. The adapter ring 41 is fitted over the lens ring 4. The lock ring 42 is fitted over the outer surface of the adapter ring 41, whereby the lens adapter 40 is integrated with the ring 41.

Figure 7A:
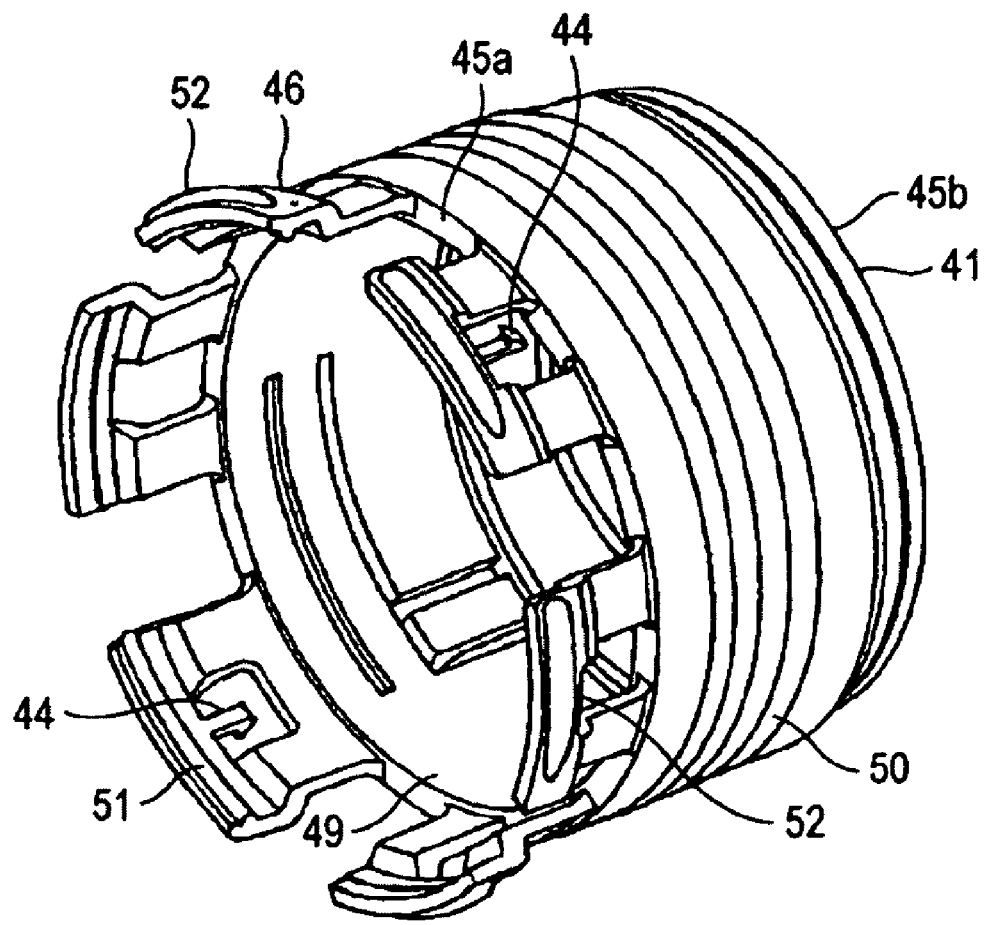
FIGS. 7A and 7B are perspective views of an adapter ring.

As shown in FIG. 7A, the adapter ring 41 has a substantially cylindrical ring body 45. The body 45 has fitting portions 46 at one end 45a in the direction of the height. The fitting portions 46 are brought into engagement with the fitting engagement portion 37 of the lens ring 4. The fixed aperture 48 is formed at the other end 45b in the direction of the height, as well as an installation portion 47 in which the optical component is mounted. The fixed aperture 48 is open near the installation portion 47. The ring body 45 is provided with fitting grooves 50 in its outer surface. The lock ring 42 is fitted in the fitting grooves 50 extending circumferentially.

The fitting portions 46 formed at one end 45a of the ring body 45 in the direction of the height are regularly spaced from each other circumferentially of the ring body 45. The number of the fitting portions 46 is at least three, six in FIG. 7A, in number. Because the fitting portions 46 are regularly spaced from each other, the lens adapter 40 can resist shocks applied from every direction. Hence, disengagement from the lens ring 4 can be prevented.

As shown in FIG. 7A, the fitting portions 46 have flexibility inwardly and outwardly of the ring body 45. Each of the fitting portions 46 has the fitting convex portions 51 on its inner surface, the fitting convex portions 51 being fitted in the concave groove 38 in the lens ring 4. Each fitting portion 46 has an abutment convex portion 52 on its outer surface. The abutment convex portion 52 is abutted against the lock ring 42.

Figure 8:
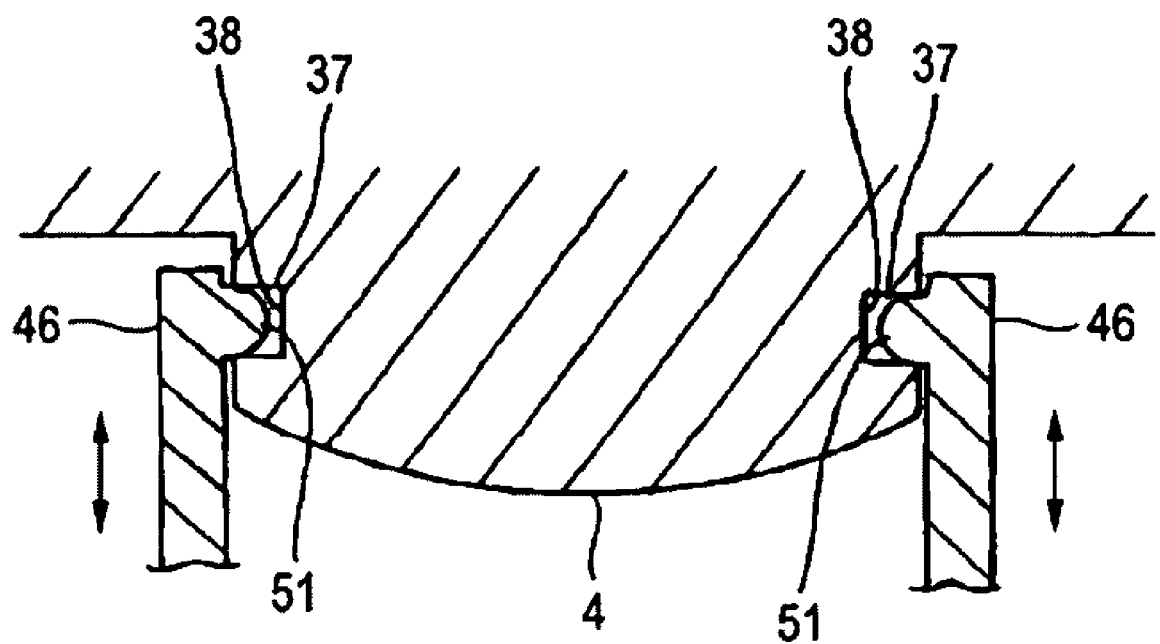
FIG. 8 is a cross-sectional view of a fitting convex portion fitted in a concave groove.

The fitting convex portions 51 are substantially semicircular in cross section and formed circumferentially of the ring body 45. As shown in FIG. 8, because the fitting convex portions 51 are substantially semicircular in cross section, it is easy to insert and withdraw the convex portions into and from the concave groove 38. The fitting convex portions 51 have flat end surfaces fitted in the concave groove 38 formed in the lens ring 4. If the convex portions are moved through the groove 38, the limiting wall 39 comes into abutment with the end surfaces, thus limiting motion through the concave groove 38. Accordingly, the adapter ring 41 fitted in the fitting engagement portion 37 of the lens ring 4 is restricted in forward and rearward rotation when the fitting convex portions 51 are moved through the concave groove 38 and come into abutment with the limiting wall 39. Consequently, it is possible to mount and dismount the optical component 43 to and from the installation portion 47.

Figure 7B:
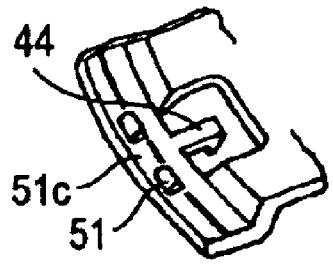

The fitting convex portions 51 may be so formed that gaps 51c having a width corresponding to the width of the limiting blocks 39a formed in the concave groove 38 created in the lens ring 4 are left between adjacent ones of the fitting convex portions 51 as shown in FIG. 7B. Once the limiting blocks 39a of the adapter ring 41 have been engaged in the gaps 51c, forward and rearward rotations are restricted. Therefore, motion can be restricted without the need to rotate the fitting convex portions 51 again. It is possible to mount and dismount the optical component 43 quickly.

The abutment convex portions 52 formed on the outer surface of the fitting portions 46 have substantially semicircular cross-sectional convex parts formed circumferentially of the ring body 45. Because the abutment convex portions 52 of the adapter ring 41 come into abutment with the lock ring 42, the fitting portions 46 are prevented from being flexed outward.

The diameter of this ring body 45 at its one end 45a side at which the fitting portions 46 are formed is substantially identical with the diameter of the lens ring 4 and, therefore, the fitting portions 46 are forcedly inserted while being slightly flexed outwardly. The fitting convex portions 51 are rotatably fitted in the concave groove 38 formed in the lens ring 4. The fitting portions 46 are at least three in number and regularly spaced from each other. Therefore, the curvature of each fitting portion 46 in the outward direction can be reduced. The fitting portions 46 are readily flexed outwardly when pressed into or withdrawn from the lens ring 4. Consequently, the user can easily mount and dismount it.

Engagement portions 44 protrude from the fitting portions 46. The engagement portions 44 engage the lock ring 42 to prevent the lock ring 42 from coming off. The engagement portions 44 stand upright toward the other end 45b in the direction of the height of the adapter ring 41. The front end of each engagement portion 44 is shaped like a hook. Engagement protrusive portions 55 of the lock ring 42 abut against the hook-shaped front ends of the engagement portions 44, thus preventing the lock ring 42 from coming off toward the other end 45b. The engagement portions 44 are formed on all the fitting portions 46. Alternatively, the engagement portions 44 may stand upright from all or some of the fitting portions 46 which are regularly spaced from each other.

The installation portion 47 formed at the other end 45b of the ring body 45 in the direction of the height is provided with a threaded groove in the inner surface of the ring body 45. The installation portion 47 is screwed into a threaded groove formed in the outer surface of the optical component 43 such as a tele-conversion lens. When end surfaces of the fitting convex portions 51 fitted in the concave groove 38 abut against the aforementioned limiting wall 39, rotation is restricted. Accordingly, if the optical component 43 is rotated when the optical component 43 is mounted or removed, the ring body 45 of the adapter ring 41 is also rotated. When the fitting convex portions 51 abut against the limiting wall 39, rotation of the ring body 45 is restricted. This permits the optical component 43 to be mounted to or removed from the ring body 45.

The adapter ring 41 is shaped in the form of a hollow cylinder. This forms a hollow portion 49 through which the outer movable barrel portion 32 and inner movable barrel portion 33 of the lens portion 3 extend, the outer barrel portion 32 and the inner barrel portion 33 constituting the zoom optical system of the camera body 2. Accordingly, even where the lens portion 3 is manipulated toward the far end and the outer movable barrel portion 32 and inner movable barrel portion 33 protrude to the greatest extent ahead of the front surface 2a of the camera body 2, the adapter ring 41 extends into the hollow portion 49. Therefore, interference with the outer movable barrel portion 32 and inner movable barrel portion 33 does not take place.

Figure 9:
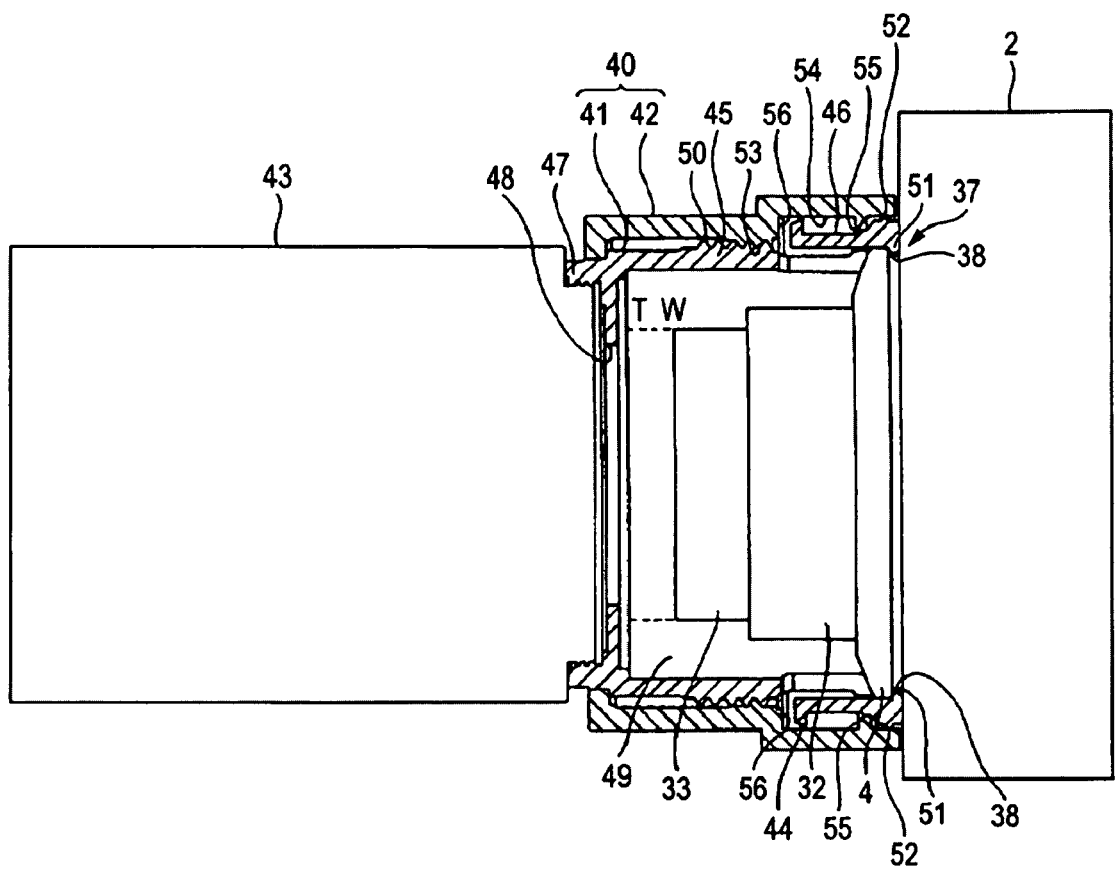
FIG. 9 is a cross-sectional view of a digital still camera and a lens adapter in which a lock ring has been slid into a locked position.
Figure 10:
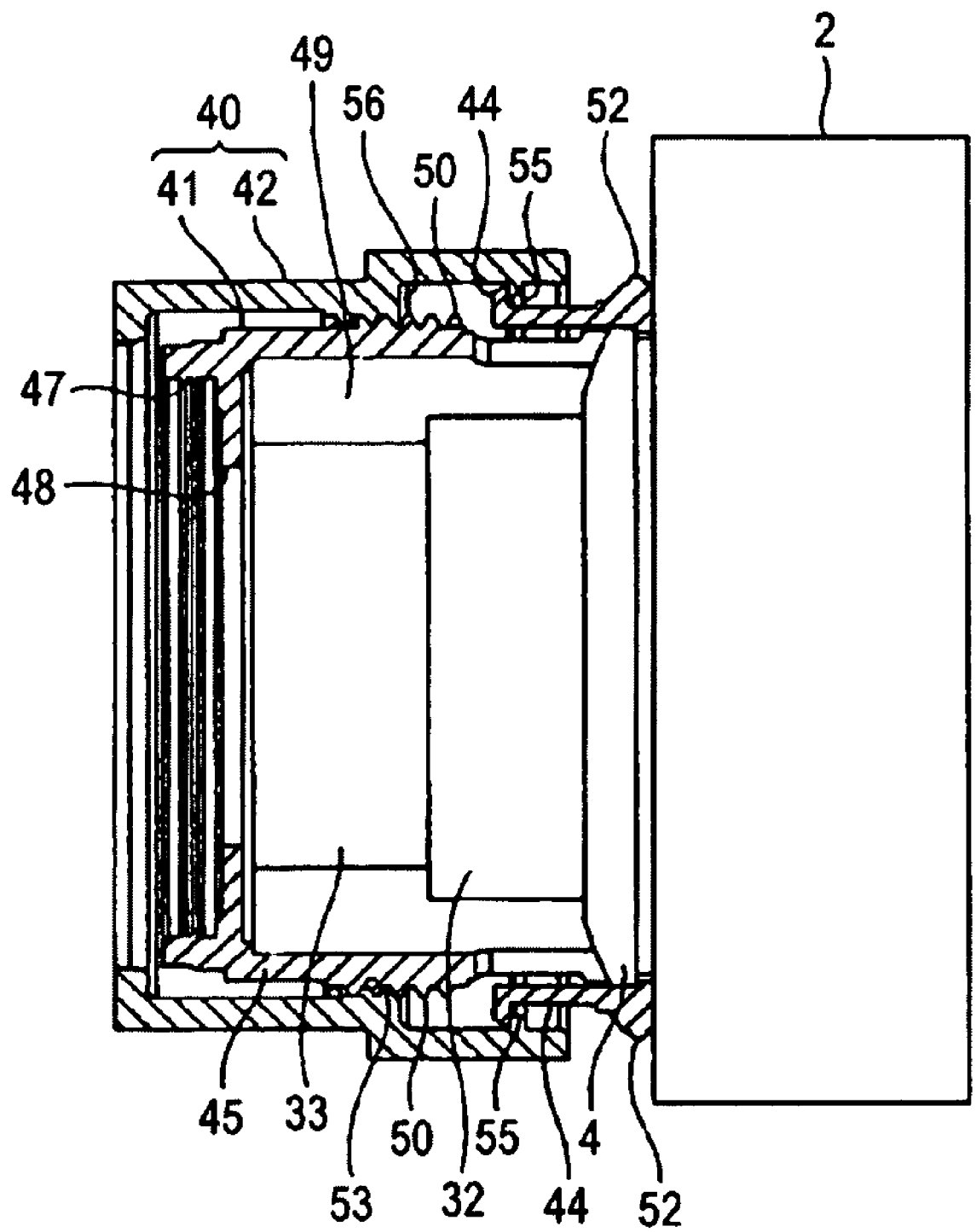
FIG. 10 is a cross-sectional view of the digital still camera and the lens adapter in which the lock ring has been slid into an unlocked position.

The lock ring 42 fitted in the adapter ring 41 is substantially cylindrical in shape. As shown in FIGS. 9 and 10, the ring 42 is fitted over the outer surface of the adapter ring 41 so as to be movable in the direction of the height. The inside diameter of the lock ring 42 at one end 42a in the direction of the height is set slightly greater than the inside diameter at the other end 42b. The lock ring 42 has threaded ridges 53 in the inner surface at the side of the other end 42b. The threaded ridges 53 are fitted in the fitting grooves 50 formed in the outer surface of the adapter ring 41. An idly rotating portion 54 idly rotating relative to the fitting grooves 50, engagement protrusive portions 55 for preventing the lock ring 42 from coming off from the adapter ring 41, and an engagement step portion 56 are formed circumferentially in the inner surface on the side of one end 42a.

When the user rotates the lock ring 42 as described above forward or rearward, the threaded ridges 53 are moved along the fitting grooves 50 formed in the adapter ring 41. Consequently, the ridges 53 slide heightwise of the adapter ring 41. In particular, when the threaded ridges 53 are slid along the fitting grooves 50 toward one end of the adapter ring 41 in the direction of the height, the end surface of the lock ring 42 on the side of one end 42a is brought into abutment with the front surface 2a of the camera body 2. Further sliding motion is restricted. Consequently, as shown in FIG. 9, the inner wall at one side of the lock ring 42 is placed opposite to the fitting portions 46 of the adapter ring 41 and slid into the locked position where the abutment convex portions 52 formed on the fitting portions 46 are supported from the outside. When the lock ring 42 is slid into the locked position, the fitting portions 46 are prevented from being flexed outwardly. In consequence, the fitting convex portions 51 are prevented from coming off the concave groove 38.

On the other hand, when the threaded ridges 53 of the lock ring 42 are slid toward the other end of the adapter ring 41 in the direction of the height along the fitting grooves 50, the threaded ridges 53 disengage from the fitting grooves 50. The grooves 50 are located in the idly rotating portion 54. The engagement portions 44 of the fitting portions 46 are made to engage the engagement protrusive portions 55. Accordingly, if the lock ring 42 is rotated toward the other end of the adapter ring 41, the ring 42 rotates idly relative to the adapter ring 41. The engagement protrusive portions 55 engage the engagement portion 44, thus preventing disengagement from the adapter ring 41. Consequently, as shown in FIG. 10, the lock ring 42 is retracted from the locked position where the inner wall on the side of one end is located opposite to the fitting portions 46 of the adapter ring 41. The ring 42 is slid into the unlocked position where the fitting convex portions 51 can be disengaged from the concave groove 38. When the lock ring 42 is slid into the unlocked position, the fitting portions 46 are no longer supported on their outer side by the lock ring 42 and so can be flexed freely outwardly. The fitting portions 46 can be mounted and dismounted to and from the fitting engagement portion 37.

As shown in FIG. 10, in the lens adapter 40 constructed in this way, the adapter ring 41 is brought into engagement with the fitting engagement portion 37 of the lens ring 4 while the lock ring 42 has been slid into the unlocked position where the ring 42 is not opposite to the abutment convex portions 52 of the fitting portions 46. The fitting portions 46 of the adapter ring 41 can be flexed outwardly because the lock ring 42 has been slid into the unlocked position. The fitting convex portions 51 are pressed into the concave groove 38.

After the fitting convex portions 51 have been fitted in the concave groove 38, if the lock ring 42 is rotated in one direction in which the ring 42 is slid into the locked position, the adapter ring 41 rotates the fitting engagement portion 37 of the lens ring 4 together with the lock ring 42. The fitting convex portions 51 are moved through the concave groove 38. When the fitting convex portions 51 come into abutment with the limiting wall 39 formed in the concave groove 38, rotation of the adapter ring 41 is restricted. Under this condition, if the lock ring 42 is rotated further in one direction, the lock ring 42 slides toward one end 45a side of the ring body 45 and moves into the locked position where the ring 42 is opposite to the fitting portions 46 of the adapter ring 41 while the threaded ridges 53 are kept in engagement with the fitting grooves 50. At this time, the end surface on the side of one end 42a of the lock ring 42 comes into abutment with the front surface 2a of the camera body 2, whereby sliding motion is restricted. As shown in FIG. 9, because the lock ring 42 has been slid into the locked position, the lock ring 42 abuts against the abutment convex portion 52 of the adapter ring 41. Since outward flexure of the fitting portions 46 is restricted, disengagement from the fitting engagement portion 37 is prevented.

Then, the optical component 43 such as a tele-conversion lens is mounted to the installation portion 47 of the adapter ring 41. The optical component 43 is rotated in one direction relative to the adapter ring 41, whereby the optical component 43 is screwed into the ring. The rotation in this one direction of the ring 41 is restricted by the limiting wall 39 and so the optical component 43 is permitted to rotate in this one direction relative to the ring 41. Consequently, the optical component 43 is mounted in the installation portion 47.

Even when the lens adapter 40 is mounted to the lens ring 4, the zoom optical system of the lens portion 3 of the digital still camera 1 can be manipulated toward the far end or toward the wide angle end. That is, as shown in FIG. 9, the inner movable barrel portion 33 of the lens barrel 30 can protrude without interfering with the inside of the adapter 40 at both wide angle end W and far end T.

Where the optical component 43 is removed from the installation portion 47, the optical component 43 is rotated in a direction reverse to the aforementioned one direction relative to the adapter ring 41. At this time, if the optical component 43 is rotated in the other direction, the adapter ring 41 is also rotated in the other direction at first. However, the fitting convex portions 51 soon come into abutment with the limiting wall 39. Rotation in the other direction is restricted. Accordingly, the optical component 43 can be rotated in the other direction relative to the adapter ring 41 and disengaged from the installation portion 47.

Then, if the lock ring 42 is rotated in the other direction while rotation of the adapter ring 41 in the other direction is being restricted, the threaded ridges 53 slide toward the other end 45b of the ring body 45 while in engagement with the fitting grooves 50. The ridges 53 are slid into the unlocked position where the ridges are not opposite to the abutment convex portion 52. At this unlocked position, the threaded ridges 53 are disengaged from the fitting grooves 50. The fitting grooves 50 are located in the idly rotating portion 54. The engagement portions 44 of the fitting portion 46 is made to engage the engagement protrusive portions 55. Therefore, the lock ring 42 rotates idly relative to the adapter ring 41. The engagement protrusive portions 55 engage the engagement portions 44 to thereby prevent the lock ring 42 from disengaging from the adapter ring 41. The adapter ring 41 is allowed to be flexed outwardly of the fitting portions 46. It is easy for the user to perform a manipulation for removing the adapter ring 41 from the fitting engagement portion 37.

According to the lens adapter 40 constructed as described so far, the adapter ring 41 is mounted to the lens ring 4 mounted on the side of the digital still camera 1 by bringing the fitting convex portions 51 into engagement with the concave groove 38. The lock ring 42 can prevent the fitting convex portions 51 from being disengaged from the concave groove 38. Therefore, the height of the lens ring 4 can be made lower. The thinness of the camera body 2 can be maintained. An optical component such as a tele-conversion lens can be mounted reliably.

Figure 11:
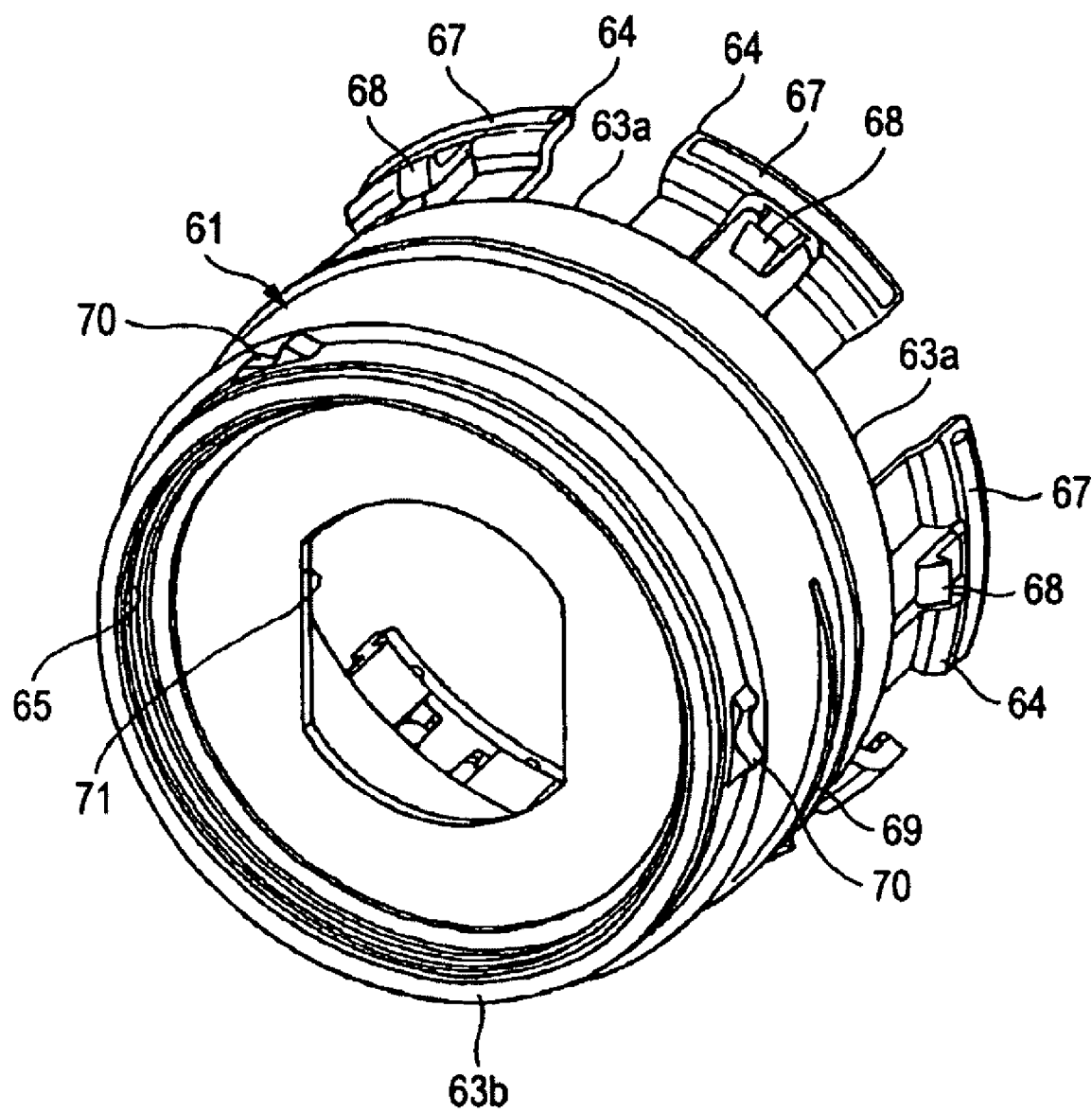
FIG. 11 is a perspective view of an adapter ring for another lens adapter according to a further embodiment.
Figure 12:
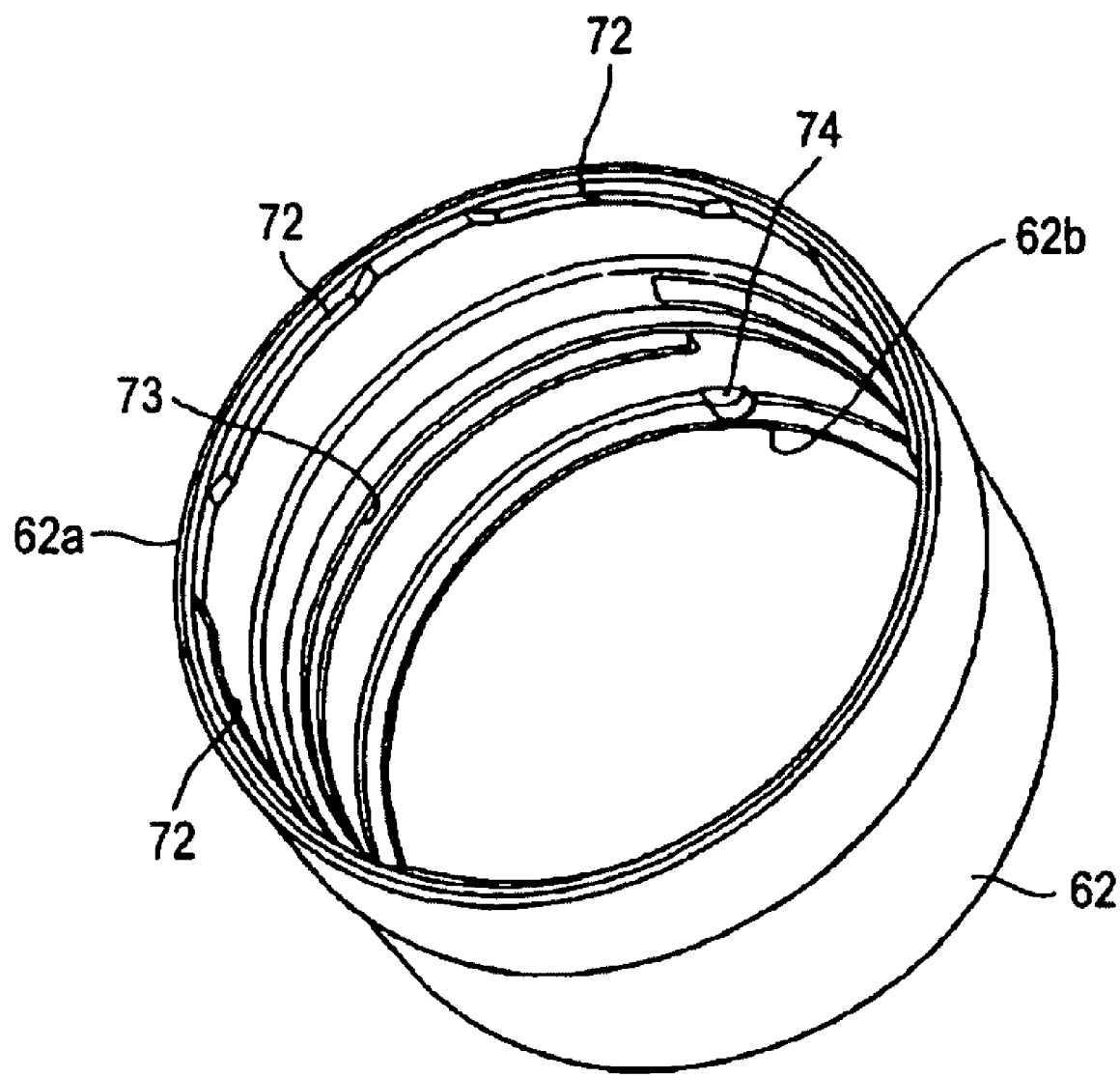
FIG. 12 is a perspective view of a lock ring for use with a further lens adapter according to a still other embodiment.

Furthermore, the lens adapter according to an embodiment of the present invention can also be designed as follows. This lens adapter, indicated by reference numeral 60, has an adapter ring 61 shown in FIG. 11 and a lock ring 62 shown in FIG. 12. The lock ring 62 is fitted over the adapter ring 61 so as to be rotatable circumferentially. The lock ring 62 of the lens adapter 60 is manipulated so as to be rotated between a locked position where the adapter ring 61 is fitted over the lens ring 4 and an unlocked position where the adapter ring 61 is disengaged from the lens ring 4.

In the same way as the aforementioned adapter ring 41, the adapter ring 61 has plural fitting portions 64 on the side of one end 63a of a cylindrical ring body 63. The fitting portions 64 are regularly spaced from each other circumferentially. An installation portion 65 for an optical component 43 is formed on the side of the other end 63b of the ring body 63.

Figure 13:
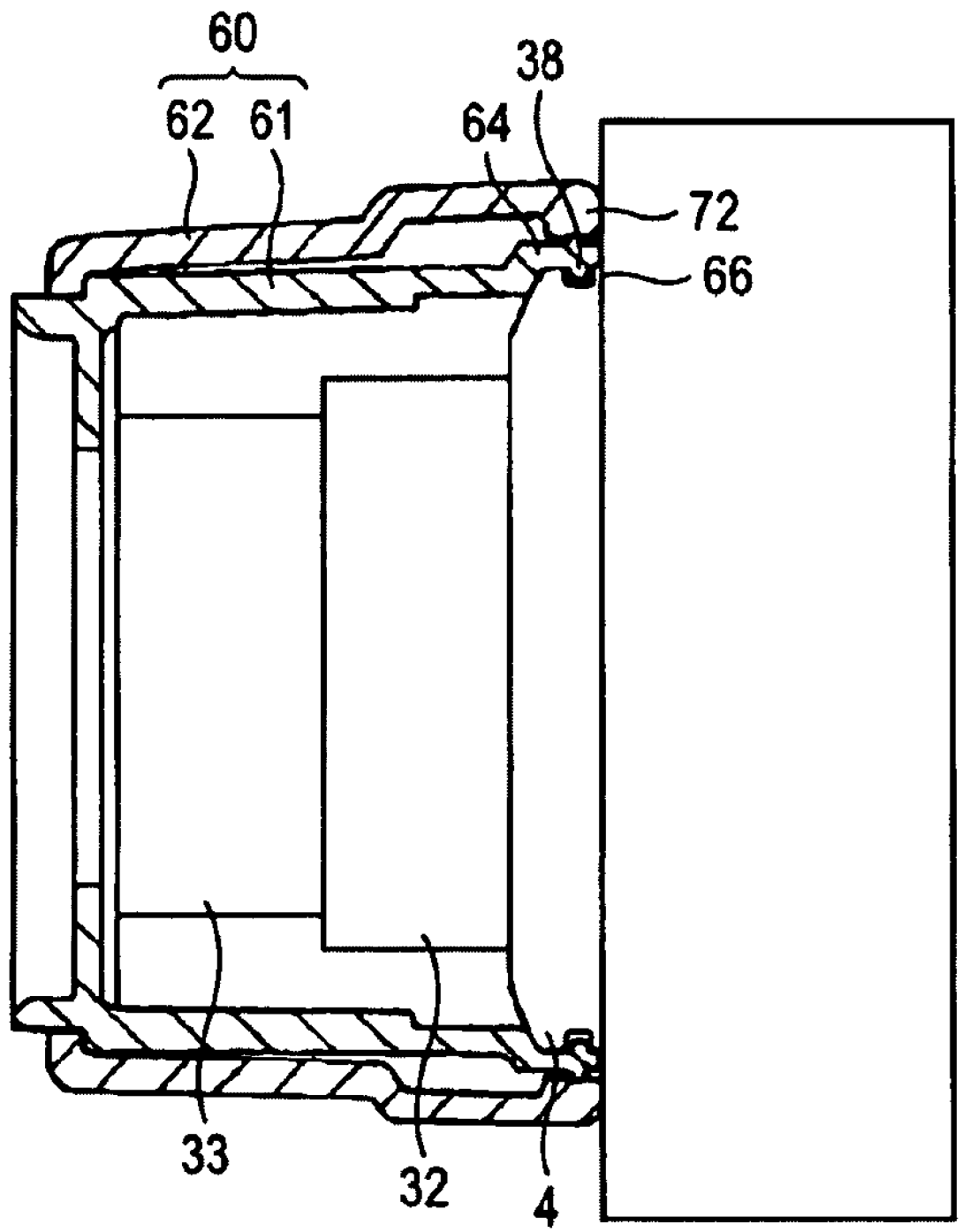
FIG. 13 is a cross-sectional view in which other lens adapter according to one embodiment of the invention has been mounted to the front surface 2a of a camera body 2.

As shown in FIG. 13, the fitting portions 64 have flexibility inwardly and outwardly of the ring body 63. Each fitting portion 64 has fitting convex portions 66 on its inner surface, the convex portions 66 being fitted in the concave groove 38 formed in the lens ring 4. An abutment convex portion 67 and engagement portions 68 are formed on the outer surface of the fitting portion 64. The abutment convex portion 67 is abutted against the lock ring 62. The engagement portions 68 prevent disengagement of the lock ring 42. Since the fitting convex portions 66, abutment convex portion 67, and engagement portions 68 are similar in structure with the above-described fitting convex portions 51, abutment convex portion 52, and engagement portions 44, their description is omitted.

Engagement convex portions 69 stand upright and circumferentially from the outer surface of the ring body 63 and rotatably engages the inner surface of the lock ring 62. Furthermore, the ring body 63 is provided with a clicking recessed portion 70 in the outer surface on the side of the other end 63b to give a feeling of clicking to the user according to whether the lock ring 62 has been rotated to the locked position or unlocked position. The clicking recessed portion 70 engages a clicking convex portion 74 formed on the side of the lock ring 62, giving the feeling of clicking.

The fixed aperture 71 is formed in the end surface on the side of the other end 63b of the ring body 63. When the adapter ring 61 is brought into intimate engagement with the fitting engagement portion 37, the fixed aperture 71 is placed opposite to the antireflective portion 35 formed on the lens portion 3, in the same way as the aforementioned fixed aperture 48. The antireflective portion 35 has an area equal to or greater than the area of the fixed aperture 71 and prevents reflection of incident light within the lens adapter 60.

The fitting convex portions 66 are pressed into the concave groove 38 formed in the lens ring 4. Thus, the adapter ring 61 is brought into intimate engagement with the fitting engagement portion 37 in the same way as the adapter ring 41 described previously. When the fitting convex portions 66 rotate along the concave groove 38 and their front ends come into abutting engagement with the limiting wall 39, the rotation is restricted.

The lock ring 62 making fitting engagement with the adapter ring 61 is substantially cylindrical in shape. The lock ring 62 is fitted over the outer surface of the adapter ring 41 so as to be movable circumferentially. The lock ring 62 has plural locking portions 72 on its inner surface on the side of one end 62a in the heightwise direction. The locking portions 72 are brought into abutting engagement with the abutment convex portions 67 formed on the outer surfaces of the fitting portions 64 of the adapter ring 61. The number of the locking portions 72 corresponds to the number of the fitting portions 64. The locking portions 72 are regularly spaced from each other circumferentially. The locking portions 72 swell out toward the center of the lock ring 62 in the circumferential direction. When the lock ring 62 is rotated around the adapter ring 61 in the circumferential direction, the lock ring 62 assumes a locked position where the lock ring 62 is opposite to the fitting portion 64 and abuts against the abutment convex portion 67 and an unlocked position where the lock ring 62 is not opposite to the fitting portion 64.

Figure 14:
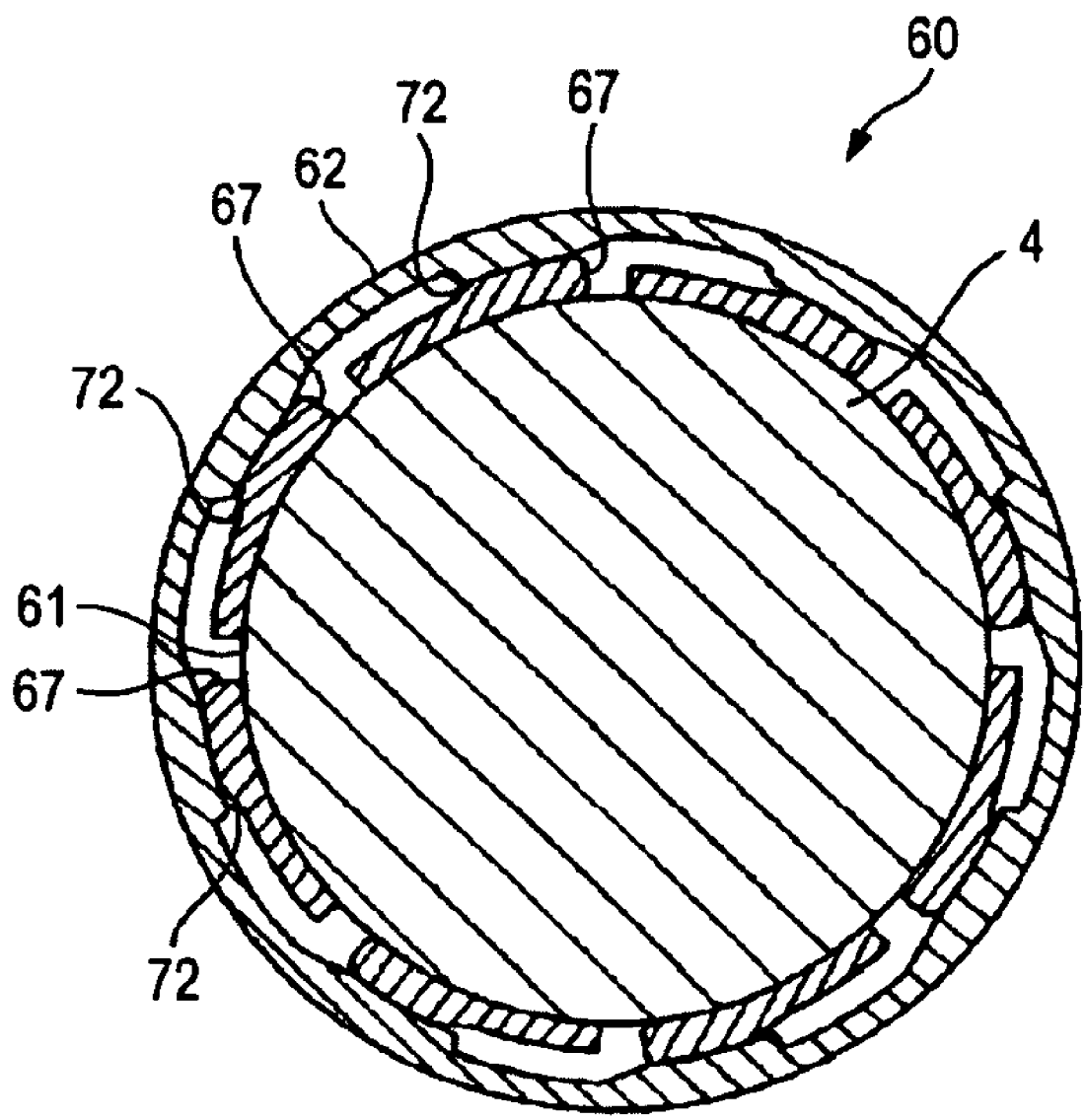
FIG. 14 is a cross-sectional view in which the lock ring of another lens adapter according to an embodiment has been rotated into the locked position.

As shown in FIGS. 13 and 14, the locking portions 72 rotated into the locked position are brought into abutting engagement with the abutment convex portion 67 to thereby prevent the fitting portions 64 from being flexed outwardly. Accordingly, in the adapter ring 61, the fitting convex portions 66 of the fitting portions 64 are prevented from being disengaged from the concave groove 38 in the lens ring 4. Meanwhile, the locking portions 72 rotated into the unlocked position move into a position where the locking portions 72 are not opposite to the abutment convex portion 67. Therefore, the abutment convex portion 67 of the adapter ring 61 is not supported by the locking portions 72 and so the fitting portions 64 are flexed outwardly. The fitting convex portions 66 can disengage from the concave groove 38 and can be taken out of the fitting engagement portion 37.

Engagement grooved portions 73 into which the engagement convex portions 69 formed on the adapter ring 61 are engaged are formed circumferentially substantially midway in the heightwise direction of the lock ring 62. When the engagement convex portions 69 engage the engagement grooved portions 73, the lock ring 62 is supported so as to be rotatable around the outer surface of the adapter ring 61.

The clicking convex portion 74 engaged in a clicking recessed portion 70 formed in the adapter ring 61 is formed in the inner surface on the side of the other end 62b in the direction of the height of the lock ring 62. The clicking convex portion 74 and clicking recessed portion 70 are formed in the inner surfaces on the sides of the other ends of the adapter ring 61 and lock ring 62, respectively. When the locking portions 72 of the lock ring 62 are rotated into the locked position and unlocked position, the clicking convex portion 74 is engaged in the clicking concave portion 70. This gives a feeling of clicking to the user. Consequently, the user can recognize that the lock ring 62 has been rotated into the locked position or unlocked position.

The adapter ring 61 and lock ring 62 can be rotated between the locked position and the unlocked position. A circumferentially extending groove for restricting rotation of the lock ring 62 is formed in the adapter ring 61. The lock ring 62 has an engagement portion inserted in the rotation-restricting groove. One end of the rotation-restricting wall corresponds to the locked position. The other end of the rotation-restricting wall corresponds to the unlocked position. Therefore, when the lock ring 62 is rotated in one direction around the outer surface of the adapter ring 61 into the locked position, rotation in this one direction is restricted while only rotation in the other direction is allowed. Similarly, when the adapter ring 61 is rotated in the other direction around the outer surface of the adapter ring 61 into the unlocked position, rotation in the other direction is restricted while only rotation in one direction is allowed.

When the lock ring 62 of the lens adapter 60 is rotated into the locked position or unlocked position in this way, a feeling of clicking is given to the operator. The fitting portion 64 of the adapter ring 61 can be locked or unlocked by restricting the rotation.

Rotation of the lock ring 62 can also be restricted by forming a pair of walls for restricting the range of rotation of the engagement convex portions 69 in the engagement grooved portions 73 in the lock ring 62 and permitting the ring 62 to rotate between the walls standing upright from the adapter ring 61. In this case, when one and the other of the walls of the lock ring 62 are made to correspond to the locked position and unlocked position, respectively, the lock ring 62 is rotated in one direction or the other relative to the adapter ring 61. If the ring 62 is moved into the locked position or unlocked position, further rotation in the one direction relative to the adapter ring 61 is restricted. Only rotation in the other direction is permitted.

In the lens adapter 60 constructed as described so far, the adapter ring 61 is fitted into the fitting engagement portion 37 of the lens ring 4 while the lock ring 62 has been rotated into the unlocked position where the locking portions 72 and the fitting portion 64 are not opposite to each other. Since the lock ring 62 of the adapter ring 61 has been rotated into the unlocked position, the fitting portion 64 can be flexed outwardly. The fitting convex portions 66 are pressed into the concave groove 38.

After the fitting convex portions 66 have been fitted in the concave groove 38, if the lock ring 62 is rotated in one direction toward the locked position, the adapter ring 61 rotates the fitting engagement portion 37 of the lens ring 4 together with the lock ring 62. The fitting convex portions 66 are moved through the concave groove 38. When the fitting convex portions 66 abut against the limiting wall 39 formed in the concave groove 38, rotation of the adapter ring 61 is restricted. Under this condition, if the lock ring 62 is rotated further in one direction, the locking portions 72 are moved into the locked position where the locking portions 72 are opposite to the fitting portion 64 of the adapter ring 61. Rotation in the same direction is restricted. Because the lock ring 62 has been moved into the locked position, the locking portions 72 of the adapter ring 61 abut against the abutment convex portion 67. Since outward flexure of the fitting portion 64 is restricted, disengagement from the fitting engagement portion 37 is prevented.

Then, the optical component 43 such as a tele-conversion lens is mounted in the installation portion 65 of the adapter ring 61. The optical component 43 is rotated in one direction relative to the adapter ring 61. Consequently, the optical component 43 is screwed in it. Accordingly, the optical component 43 can be mounted because rotation of the adapter ring 61 in the one direction is restricted by the limiting wall 39.

The optical component 43 is removed from the installation portion 65 by rotating the optical component 43 in the other direction opposite to the aforementioned one direction relative to the adapter ring 61. At this time, if the optical component 43 is rotated in the other direction, the adapter ring 61 is also rotated in the other direction at first. However, the fitting convex portions 66 come into abutting engagement with the limiting wall 39, thus restricting rotation in the other direction. Accordingly, the optical component 43 can be rotated in the other direction relative to the adapter ring 61. As a result, the optical component 43 is disengaged from the installation portion 65.

Then, if the lock ring 62 is rotated in the other direction while rotation of the adapter ring 61 in the other direction is restricted, the locking portions 72 are moved into the unlocked position where the locking portions 72 are not opposite to the abutment convex portion 67. At this unlocked position, rotation is restricted. Accordingly, the adapter ring 61 can be flexed outwardly of the fitting portion 64. The adapter ring 61 can be easily disengaged from the fitting engagement portion 37 by a user's manipulation.

Figure 15:
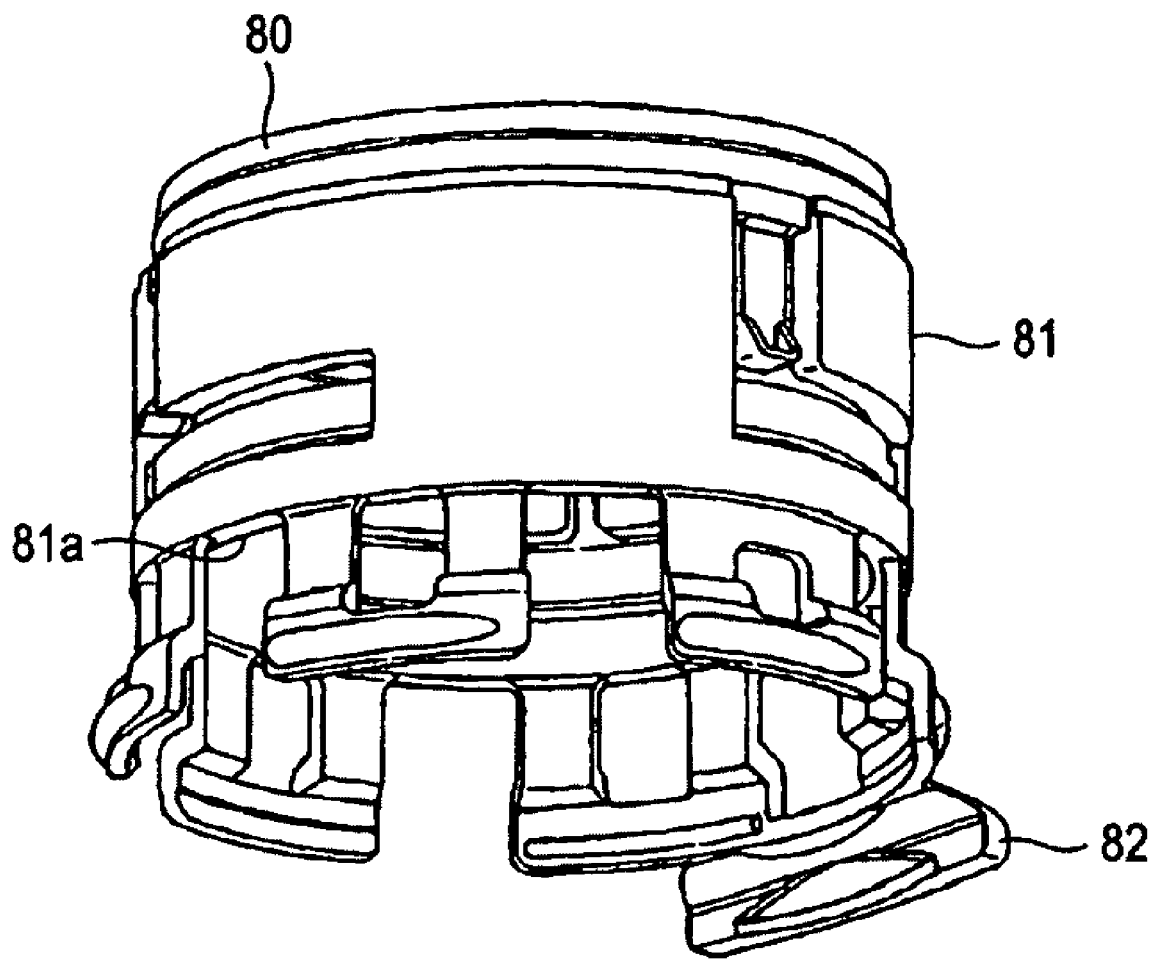
FIG. 15 is a perspective view of a an adapter ring according to an embodiment.

The lens adapter according to one embodiment of the present invention can also be constructed as described below. An adapter ring, indicated by reference numeral 80, for use with the lens adapter has a ring body 81. As shown in FIG. 15, a rotation-preventing portion 82 is formed at one end 81a of the ring body 81 in the direction of height. The rotation-preventing portion 82 is engaged to a side surface 2d of the camera body 2. Thus, rotation of the adapter ring 61 is prevented. The rotation-preventing portion 82 depends from one fitting portion.

Figure 16:
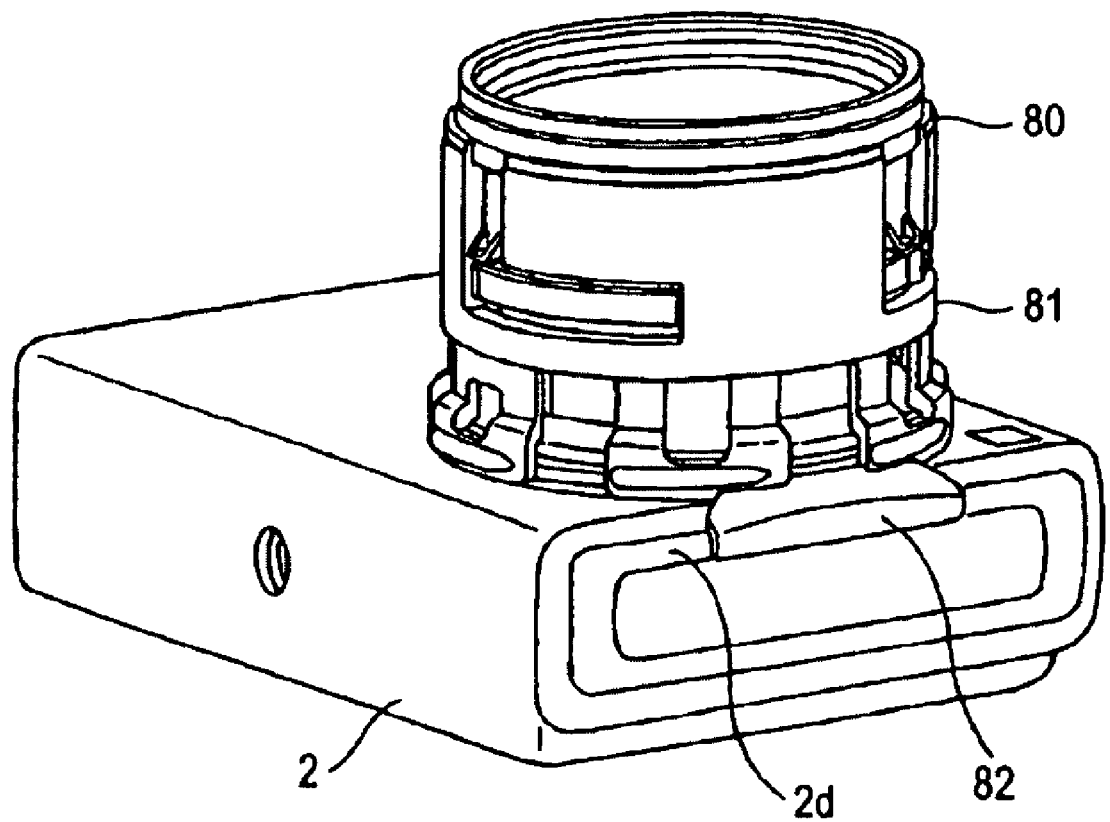
FIG. 16 is a perspective view of an imaging apparatus to which a further adapter ring according to one embodiment is mounted.

When the adapter ring 80 is brought into fitting engagement with the fitting engagement portion 37, the rotation-preventing portion 82 is engaged to the side surface 2d of the camera body 2 as shown in FIG. 16. Consequently, circumferential rotation of the adapter ring 81 is restricted. Hence, the lock rings 42 and 62 can rotate to the locked position and unlocked position. Furthermore, the optical component 43 can be mounted and removed. It is not necessary to form the limiting wall 39 in the concave groove 38 of the fitting engagement portion 37.

With respect to the digital still camera 1 and lens adapters 40 and 60 according to embodiments of the present invention, a fitting convex portion may be formed on the outer surface of the lens ring 4, and concave grooves may be formed in the inner surfaces of the adapter rings 41 and 61.

It is to be noted that the present invention is not limited to the above embodiments. In the description of the above embodiments, a tele-conversion lens is used as the optical component. Instead, a macro-conversion lens, a filter, or the like may be connected. Furthermore, a zoom lens is used as a lens barrel. A retractable, fixed focal lens may also be used. Moreover, the invention can also be applied to an imaging apparatus that is a camera other than a digital still camera. Besides, various changes and modifications may be made without departing from the gist of the present invention.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

The invention is claimed as follows:

1. A lens adapter comprising:
   an adapter ring having a flexible fitting portion and an installation portion in which an optical component is mounted, the fitting portions being fitted over a fitting engagement portion of a lens ring mounted around a lens portion facing a front surface of an imaging apparatus; and
   a lock ring fitted over an outer surface of the adapter ring, the lock ring being manipulated so as to be moved between a locked position where the lock ring is opposite to the fitting portions fitted over the fitting engagement portion and flexure of the fitting portions is prevented and an unlocked position where the lock ring is retracted from the locked position.

2. A lens adapter as set forth in claim 1, wherein the fitting engagement portion of the lens ring is made of a concave groove formed circumferentially in the lens portion, and wherein the fitting portions have a convex portion fitted in the concave groove.

3. A lens adapter as set forth in claim 2, wherein the fitting portions are at least three in number and regularly spaced from each other on the adapter ring.

4. A lens adapter as set forth in claim 2, wherein the concave groove has a restriction portion for restricting rotation of the convex portion.

5. A lens adapter as set forth in claim 1, wherein the lock ring has threaded ridges formed on its inner wall, the threaded ridges being threadedly engaged in a threaded groove formed in the outer surface of the adapter ring, and wherein the lock ring is moved between the locked position and the unlocked position along the threaded groove.

6. A lens adapter as set forth in claim 1, wherein the lock ring abuts against the front surface of the imaging apparatus at the locked position and is restricted in motion.

7. A lens adapter as set forth in claim 1, wherein the lock ring is prevented from being disengaged from the adapter ring at the unlocked position.

8. A lens adapter as set forth in claim 1, wherein the adapter ring has a hollow portion permitting a zoom lens protruding toward the front surface of the imaging apparatus from the lens portion to be moved back and forth.

9. A lens adapter as set forth in claim 1, wherein the lock ring is opposite to an antireflective portion formed on the lens portion, and wherein a fixed aperture smaller than the antireflective portion is formed.

10. A lens adapter as set forth in claim 1, wherein the adapter ring has a rotation-preventing portion which is engaged to the imaging apparatus to thereby prevent rotation relative to the lens ring.

11. An imaging apparatus comprising:
    a lens portion having a taking lens facing outward from a front surface of the body of the apparatus;
    a lens adapter having an adapter ring and a lock ring, the adapter ring having fitting portions and an installation portion in which an optical component is mounted, the lock ring being fitted over an outer surface of the adapter ring, the lock ring being manipulated so as to be moved between a locked position where the lock ring is opposite to the fitting portions and flexure of the fitting portions is prevented and an unlocked position where the lock ring is retracted from the locked position; and
    a lens ring formed around the lens portion and having a fitting engagement portion fitted to the fitting portions.

12. An imaging apparatus as set forth in claim 11, wherein the fitting engagement portion of the lens ring is made of a concave groove formed circumferentially in the lens portion, and wherein the fitting portions have a convex portion fitted in the concave groove.

13. An imaging apparatus as set forth in claim 12, wherein the concave groove has a restriction portion for limiting sliding motion of the convex portion.

14. An imaging apparatus as set forth in claim 11, wherein the lens portion has a zoom lens protruding forwardly of the body of the apparatus.

* * * * *